United States Patent [19]

Fontaine

[11] 3,928,580
[45] Dec. 23, 1975

[54] INJECTABLE GLYCOPROTEINS CONTAINING TERMINAL "C" ENDS OF HUMAN IMMUNOGLOBULINS

[76] Inventor: Michel J. Fontaine, 448, rue Paradis, 13008 Marseilles, France

[22] Filed: Mar. 19, 1974

[21] Appl. No.: 453,019

[30] Foreign Application Priority Data
Mar. 22, 1973  France .............................. 73.11455

[52] U.S. Cl. .............................. 424/177; 260/112 R
[51] Int. Cl.$^2$ ......................................... A61K 37/00
[58] Field of Search ..................................... 424/177

[56] References Cited
UNITED STATES PATENTS

| | | | |
|---|---|---|---|
| 3,597,409 | 8/1971 | Breuer................................ | 424/177 |
| 3,758,682 | 9/1973 | Huber et al......................... | 424/177 |
| 3,763,135 | 10/1973 | Shanbrom et al.................. | 424/177 |
| 3,808,189 | 4/1974 | Breuer............................... | 424/177 |

OTHER PUBLICATIONS

Heiner: Diss. Abstr. Int. B, 30, 5112 (1970).
Leslie et al.: Chem. Abstr., 75:74169g (1971).

*Primary Examiner*—Lewis Gotts
*Assistant Examiner*—Reginald J. Suyat
*Attorney, Agent, or Firm*—Brooks Haidt Haffner & Delahunty

[57] ABSTRACT

Pharmaceutical compositions comprise, as their essential active ingredients human immunoglobulin D molecules or the terminal C ends of the heavy chains of such molecules, preferably the Fc and F'c fragments. These compositions, which are usually in the form of sterile injectable solutions, have anti-allergic, anti-inflammatory and immunodepressant properties.

12 Claims, No Drawings

INJECTABLE GLYCOPROTEINS CONTAINING TERMINAL "C" ENDS OF HUMAN IMMUNOGLOBULINS

The present invention relates to pharmaceutical compositions useful as anti-allergic, anti-inflammatory and immunodepressant medicines.

It is known that immunoglobulins D are present in human serum, in amounts which vary depending on the individuals, and are present in human placenta in large amounts. Their precise physiological role and the therapeutic activity, however, have hitherto been unknown.

I have discovered that human immunoglobulins D, denoted hereafter by the abbreviation IgD, block the activity of the so-called T-type lymphocytes and macrophages by attaching themselves to their surface, thus preventing them from participating in the immunity response towards any antigen. This action of the IgD is exerted at the start of the immunity process, by preventing or by reducing the recognition of antigens, and plays a part in creating a state of immunological tolerance which is non-specific, that is to say which is exerted with respect to any antigen.

The IgD do not act on the B-type lymphocytes and on the plasmocytes which synthesise the immunoglobulins, but they can limit the perpetuation and the extension of the immunity response towards an antigen by preventing the sensitisation of new T lymphocytes and new macrophages. This inhibition of the function of the T lymphocytes and the macrophages by the IgD is a semipermanent effect but takes place without these cells being damaged or destroyed. Thus, the cells can be reused eventually by the organism when the IgD attached to their membranes are present in insufficient amounts to perpetuate the inhibition. In fact, this blocking of the T lymphocytes and macrophages gradually wanes and has been found to disappear completely ten weeks after stopping the therapeutic supply of IgD. The organism which has been treated with IgD then again possesses a wholly restored immunity defence capacity, the IgD being non-toxic both with respect to the cells which they inhibit and with respect to the cells of the haematopoietic organs.

The immunoglobulins D have a marked antihistamine activity although they do not inhibit the degranulation of mastocytes by acting either directly on the histamine which they would inactivate, or by blocking the receptors where the action of histamine is exerted.

In short, the anti-allergic, anti-inflammatory and non-specific immunodepressant action of the IgD manifests itself in three ways, namely blocking the function of the T lymphocytes, blocking the function of the macrophages and blocking the action of histamine.

Immunoglobulin D molecules are formed by combining four glycoprotein chains, of which two are light chains and two are heavy chains. It is known that each heavy chain possesses a terminal C end and a terminal N end.

I have now found that the active site which enables immunoglobulins to attach to lymphocytes and to macrophages is localised in the vicinity of the terminal C ends of the two heavy chains of the molecule.

It is known to isolate these two ends of the IgD molecule in the form of a fragment, called Fc or F′c depending on the method of isolation used. It has been observed that, for the same protein concentration, the therapeutic activity of solutions of these fragments is greater than that of solutions of whole IgD molecules.

The fact that immunoglobulins D or their fragments are devoid of toxicity and antigenicity in the case of humans even at high doses, that they can be obtained in sufficient amounts from the human placenta and from the serum of certain patients, and that they can be prepared in the form of an injectable solution which can be mixed with other medicinal substances, makes it possible to use their anti-allergic, antiinflammatory and immunodepressant properties in human therapy.

Accordingly, the present invention provides a pharmaceutical composition which contains glycoproteins comprising at least the terminal C ends of the heavy chains of human immunoglobulins D.

The compositions of the invention may conveniently be in the form of sterile, injectable solutions of the glycoproteins in a solvent such as, for example, a glycine buffer solution. The concentration by weight of glycoprotein is suitably from 1 mg/ml to 20 mg/ml, preferably of the order of 5 mg/ml. The glycoproteins may comprise the whole human immunoglobulins D molecules or, more preferably, the Fc or F′c fragments of the said immunoglobulins.

The solutions may be administered to humans in the form of subcutaneous, intradermal, intramuscular and intravenous injections as well as in the form of local infiltrations, at daily doses, per ten kilos of weight, of between about 10 mg and 200 mg of immunoglobulins D and between 5 mg and 100 mg of Fc or F′c fragments.

The solutions can also be administered during anti-allergic, anti-inflammatory and immunodepressant care treatments in chronic cases, in the form of periodic injections and local perfusions, for example every fortnight or every month, each dose containing a weight of glycoproteins of between 25 mg and 200 mg.

By using the Fc or F′c fragments containing the terminal C end (instead of the whole immunoglobulins D molecules), it is possible to obtain a purer and more active medicine for the same protein concentration.

The blocking of the function of the T lymphocytes and macrophages by the human immunoglobulins D (or the Fc or F′c fragments) is a physiological action which is non-toxic with respect to the inhibited cells (which cells can be re-used subsequently by the organism). However, this blocking action is long-lasting and stable. Human immunoglobulins D and the Fc or F′c fragments of the latter are natural organic products which are substantially devoid of toxicity for humans and for animals, even at very high doses.

Immunoglobulins D and their Fc or F′c fragments are devoid of antigenicity for humans and for animals. They do not interfere in the organism with the products used in anti-allergic, anti-inflammatory and analgesic therapies, nor with antibiotics and immunodepressants.

In order that the invention may be more fully understood, two Examples of the preparation of IgD for the purpose of the invention are given by way of illustration only. The first Example relates to the preparation of a solution of whole IgD, and the second relates to the preparation of a solution of the Fc fragment of IgD.

EXAMPLE I

Immunoglobulins D can be obtained in sufficient amounts for therapeutic use from the serum, obtained by plasmaphoresis, of humans possessing high levels of IgD, or from human placentas. In this Example, the extraction was effected from a human placenta, which is in fact the richest source of IgD.

The first step was to obtain all the placental immunoglobulins. To do this, the placenta was ground mechanically in an equal volume of physiological serum at about +4°C. The ground product was thereafter stirred in its liquid and then centrifuged. The supernatant liquid was removed and then precipitated using 40% strength alcohol at about +4°C. at pH 6.8. The precipitate was placed in a dialysis cell and was redissolved by dialysis against physiological serum at +4°C for 48 hours, using a ratio of one volume of precipitate per 10 to 20 volumes of physiological serum. The physiological serum could be replaced, for example, by 0.01 M phosphate buffer of pH 8. The solution of all the immunoglobulins thus obtained was reconcentrated by evaporation in vacuo or ultracentrifuging on a selective membrane. The quantity of IgD in the reconcentrated solution was measured by immunodiffusion in agar containing a specific anti-(human IgD) animal serum, the activity of which is measured (Mancini method). The solution must contain approximately 200 to 300 mg of IgD per 100 ml after reconcentration.

The second step was to separate the IgD from the other placental immunoglobulins. To do this, the reconcentrated solution of all the placental immunoglobulins was placed on a DEAE Sephadex A 50 chromatography column (dimensions 25 mm by 45 cm), equilibrated with 0.01 M phosphate buffer of pH 8 and cooled to +4°C. Elution was effected in an ionic strength gradient ranging from 0.01 M to 0.3 M phosphate of pH 8, the gradient change being programmed and being stopped whilst each class of immunoglobulins was eluted. Each fraction was analysed by immunoelectrophoresis and measured in accordance with the Mancini method.

In a third step, the phosphate buffer of pH 8 which acted as a solvent for the IgD was removed. In effect, this reduces the activity of the IgD in proportion to the rise in temperature above +8°C. For this purpose, the fraction collected containing the pure IgD was precipitated by means of 40% strength alcohol at about +4°C. The precipitate of IgD was collected and then redissolved by dialysis against physiological serum at +4°C for 48 hours, using a ratio of 1 volume of precipitate per 10 volumes (approximately) of physiological serum. The solution of IgD thus obtained was reconcentrated by ultrafiltration through a selective membrane at about +4°C, so that its strength was between 600 and 800 mg of IgD per 100 ml of physiological serum (checked by the Mancini method).

In a fourth step, the preparation of the solution was completed by adding glycine buffer of pH 6.8 to the above reconcentrated solution so that the quantity of IgD therein was established at between 250 mg and 350 mg per 100 ml (checked by the Mancini method), then by filtering through a millipore membrane and finally by dispensing it under sterile conditions into 5 ml ampoules.

Thus, the solution of whole IgD for therapeutic use consisted, in this Example, of 0.33 ml of apyrogenic sterile physiological serum, 0.67 ml of apyrogenic sterile glycine buffer of pH 6.8 and 2.5 to 3.5 mg of immunoglobulins D, in each 1 ml of the solution.

EXAMPLE II

The first steps in this Example were identical to those of Example I, namely the isolation of the immunoglobulins from ground human placenta, followed by isolation of the immunoglobulins D from all the placental immunoglobulins.

The IgD were then concentrated to the extent, for example, of 10 mg per ml of 0.1 M sodium phosphate buffer of pH 7. The Fc fragments of the IgD were obtained by digestion using mercuripapain in accordance with the following technique: 0.1 mg of mercuripapain, 1.86 mg of 0.005 M EDTA and 1.21 mg of 0.01 M cysteine were added per 1 ml of 0.1 M phosphate buffer of pH 7 containing 10 mg of IgD. These products were mixed and hydrolysis took place over the course of 4 to 5 hours at 37°C.

The reaction was then stopped by dialysis against distilled water at +4°C and then against 0.005 M phosphate buffer of pH 8. The Fc and Fab fragments were isolated by chromatography on a DEAE cellulose column (dimensions 25 mm by 6.5 cm) cooled to +4°C in an ionic strength gradient of 0.005 M to 0.3 M phosphate of pH 8.

The fraction containing the Fc fragments of the IgD was collected in the phosphate buffer and then reconcentrated by evaporation in vacuo. The remaining phosphate buffer was then removed by dialysis against glycine buffer of pH 6.8 for 72 hours at +4°C, using a volume ratio of 1 to 10. The solution obtained was reconcentrated by ultrafiltration through a selective membrane in such a way that it contained, for example, 5 mg of Fc fragments of IgD per ml of glycine buffer of pH 6.8. The quantity of proteins in the solution was given by the Kjeldahl method. The solution was then filtered through a millipore membrane and dispensed under sterile conditions into 5 ml ampoules.

In this Example, the solution of Fc fragments of IgD for therapeutic use consisted of 5 mg of Fc fragments of IgD per 1 ml of apyrogenic sterile glycine buffer of pH 6.8.

PROPERTIES OF THE SOLUTIONS FOR THERAPEUTIC USE

The two solutions made by Examples I and II were found to have the following properties:

Their protein content was approximately between 2.5% and 6.5%. The solution of Example I had a clear appearance whilst that of Example II had a moire appearance due to the spontaneous tendency of the fragments to crystallise, which does not in any way affect their therapeutic activity and their absence of toxicity.

The molecular weight of the IgD in the Example I solution was approximately 188,000 whilst that of the Fc fragments of IgD in the Example II solution was approximately 65,000. Both solutions reacted in agar immunoprecipitation against anti-(human IgD) animal serum to form at least one line of immune precipitate.

The sterility of the solutions was ensured by filtration through a millipore membrane, by dispensing under sterile conditions and by the glycine buffer of pH 6.8. It was checked by systematic culture of solutions on the usual media. The biological activity of the solutions in glycine buffer of pH 6.8 and at storage at +4°C, was maintained.

Human T lymphocytes incubated for one hour at 37°C in these two solutions attached the IgD or the Fc fragments of IgD therein to their surface. After this attachment, the T lymphocytes could no longer react in tests investigating the lymphocyte reactivity in vitro. The absence of IgD or of Fc fragments of IgD before incubation, and their presence after incubation on the membranes of the T lymphocytes, was checked by immunofluorescence with an anti-(human IgD) fluorescent serum.

The use of these two solutions in lymphoblast transformation tests in the presence of phytohaemagglutinin or any other mitogenic agent, considerably reduces the lymphoblast transformation. When added to mixed lymphocyte cultures, the solutions reduce the reactivity of the lymphocytes. When used in macrophage migration inhibition tests, the solutions inhibit the migration of macrophages. When added to rosette tests using the red globuli of sheep, the solutions inhibit the formation of rosettes.

When the solutions were administered intravenously to animals (monkeys and dogs) who had been given a hetero-graft, they caused a delay in the appearance of the rejection phenomena and, sometimes, even prevented their appearance.

In the case of a patient who was allergic to a known allergen, the intradermal injection of a suspension of this allergen mixed with IgD or with the Fc fragments of IgD, no longer caused the appearance of the immediate cutaneous hypersensitive reaction, or at the very least reduced it considerably.

The solutions of Examples I and II were nontoxic to animals even at very high doses. Animals weighing 10 kg withstood, without any clinical manifestation of intolerance, injections of doses up to 50 times greater than those used in the case of humans.

The immunodepression induced by the two solutions was very marked. It was checked by the drop in the reactivity of the lymphocytes of the treated subject in tests in vitro. In prolonged and intense treatments, this immunodepression induced a sensitivity to infections which could be prevented easily by also administering covering anti-biotherapy.

The solutions were not antigenic either for humans or for laboratory animals, even when they were administered at high doses and for a long period. This absence of antigenicity was checked by watching carefully for clinical and biological signs showing possible immunisation.

The anti-allergic, anti-inflammatory and immunodepressant action of the IgD or of their fragments, lasts for a long time: when they cease to be supplied therapeutically, their action decreases gradually and disappears towards the tenth week after stopping the treatment.

The anti-allergic and immunodepressant action of the IgD or of their fragments, is non-specific, that is to say it causes an immunity tolerance state with respect to any antigen.

The solutions of the invention can be administered in the form of subcutaneous or intradermal or intramuscular or intravenous injections. In view of the total absence of toxicity, intravenous administration is preferable because it permits better therapeutic activity of the solutions. It can be used either by direct intravenous injection of the solutions by means of a syringe, or by perfusion, the IgD or their fragments being mixed with the perfusion products. Intramuscular administration can also be used easily, especially in treatments with the Fc fragments of IgD. These solutions can also be used in local treatment, such as aerosols, instillations, infiltrations, washings and the like.

The compositions of the invention can include other suitable medicines, e.g. anti-allergic, anti-inflammatory, analgesic, immunodepressant and antibiotic medicines. The IgD or fragments thereof do not interfere in any way with therapeutic effects of anti-inflammatory, anti-allergic, analgesic, immunodepressant and antibiotic products.

The solutions used in human therapy will suitably contain 5 mg of IgD per ml, corresponding to 25 mg of IgD per 5 ml ampoule, and 5 mg of Fc fragment of IgD per ml, corresponding to 25 mg of Fc fragment of IgD per 5 ml ampoule.

It should be recalled that, for the same volume and for the same concentration, the solution of Fc fragments of IgD is about two and a half times more active than the solution of whole IgD. Thus, the therapeutic doses generally to be employed for humans are, on average, of the order of: 25 to 50 mg of IgD per 10 kg of body weight and per day, or 10 to 20 mg of Fc fragments of IgD per 10 kg of body weight and per day in treatments of acute cases; and 25 mg of IgD in the case of children and 50 mg of IgD in the case of adults, once every fortnight or once every month, or 25 mg of Fc fragments of IgD every month in the case of children and every fortnight in the case of adults, in treatments of chronic cases. These posologies are given by way of illustration and do not imply a limitation.

THERAPEUTIC INDICATIONS

The compositions of the invention can be used in the treatment of allergy illnesses in children and adults. The posologies indicated below are given by way of example only. The treatment for combating acute allergy affections is generally carried out at doses of between 10 mg and 50 mg of IgD, or 5 mg and 20 mg of Fc fragments of IgD, per 10 kg of body weight and per day. In very serious cases, these doses can be raised, without danger, to 200 mg of IgD, or 100 mg of Fc fragments of IgD, per 10 kg of body weight and per day. In these cases, intravenous administration is preferable. The treatment of chronic cases is generally carried out using posologies of the order of 25 mg of IgD in the case of children under 10 years, and 100 mg of IgD in the case of patients over 10 years, administered intramuscularly once every fortnight or every month, for two to three months. In these cases, the Fc fragments of IgD are used at the rate of 25 mg in the case of children under 10 years, and 50 mg in the case of patients over 10 years, administered intramuscularly once per month. The immunoglobulins D, or their active fragment, can also be used in local treatment: by way of example, they can be used in the form of aerosols in allergy affections of the respiratory tracts.

The compositions can be used in the treatment of some inflammatory phenomena. Their immunodepressant action makes their use inadvisable, however, in inflammations of infectious origin unless accompanied by antibiotherapy. In general and acute inflammatory phenomena, the IgD or their fragments, are administered at posologies of between 25 and 50 mg in the case of the IgD, and between 10 and 20 mg in the case of the Fc fragments of IgD, per 10 kg of body weight and per day. In chronic cases, the IgD are used at the rate of 25 to 50 mg, once every fortnight or every month. The Fc fragments of IgD can also be used at the rate of 25 mg once per month. In local inflammatory phenomena, the IgD or their fragments can be used in infiltration.

The compositions of the invention can be applied to the treatment of auto-immune illnesses. In acute outbreaks, the posolgies employed can be as much as 200 mg of IgD, or 100 mg of Fc fragments of IgD, per 10 kg of body weight and per day. They have to be changed as a function of the clinical results. In chronic cases, apart from evolutive outbreaks, posologies of the order of 100 mg of IgD every fortnight, or 75 mg of Fc fragments of IgD every month, are used.

The compositions can also be used in the prevention and treatment of the rejection phenomena in organ grafts. Rejection is reduced, or even prevented, with doses of the order of 100 mg of IgD, or 50 mg of Fc fragments of IgD, per 10 kg of weight and per day during the week before and the week following the graft. Tolerance of the graft is then maintained by the administration of 200 mg of IgD, or 75 mg of Fc fragments of IgD, every fortnight. In the case of rejection of the graft, the treatment is carried out with posologies of the order of 200 mg of IgD, or 75 mg of Fc fragments of IgD, per 10 kg of weight and per day.

I claim:

1. A pharmaceutical composition having anti-allergic, anti-inflammatory, and immunodepressant activity comprising a sterile injectable solution of from 1 mg/ml to 20 mg/ml of glycoproteins consisting essentially of the terminal C ends of the heavy chains of human immunoglobulins D.

2. A composition according to claim 1, wherein the solution contains 5 mg/ml of glycoproteins.

3. A composition according to claim 1, in which the said glycoproteins are Fc fragments of human immunoglobulins D molecules.

4. A composition according to claim 1, in which the said glycoproteins are F'c fragments of human immunoglobulins D molecules.

5. A method of treating human beings which comprises administering parenterally a daily dose of between 10 mg and 200 mg of glycoproteins consisting essentially of the terminal C ends of the heavy chains of human immunoglobulins D per ten kilograms of body weight.

6. A method according to claim 5 wherein the administration is carried out by intravenous injection.

7. A method according to claim 5 wherein the administration is carried out by intramuscular injection.

8. A method according to claim 5 wherein the administration is carried out by intradermal injection.

9. A method according to claim 5 wherein the administration is carried out by subcutaneous injection.

10. A method according to claim 5 wherein the daily dose comprises from 5 to 100 mg of Fc or F'c fragments of the immunoglobulins per ten kilograms of body weight administered intravenously.

11. A method according to claim 5 wherein the daily dose comprises from 5 to 10 mg of Fc or F'c fragments of the immunoglobulins per ten kilograms of body weight administered intramuscularly, subcutaneously, or intradermally.

12. A process according to claim 5 wherein the daily dose comprises from 10 to 20 mg of the immunoglobulins D per ten kilograms of body weight, administered intramuscularly, subcutaneously, or intradermally.

* * * * *